(12) United States Patent
Chen et al.

(10) Patent No.: US 8,065,891 B2
(45) Date of Patent: Nov. 29, 2011

(54) GLASS LAMPSHADE AND METHOD FOR PRODUCING THE SAME

(75) Inventors: Haisheng Chen, Shenzhen (CN); Naiqun Jiang, Shenzhen (CN); Chunping Zhang, Shenzhen (CN)

(73) Assignee: Shenzhen Tronsin illuminating Technique Ltd., Shenzhen (CN)

( * ) Notice: Subject to any disclaimer, the term of this patent is extended or adjusted under 35 U.S.C. 154(b) by 208 days.

(21) Appl. No.: 12/484,269

(22) Filed: Jun. 15, 2009

(65) Prior Publication Data

US 2009/0311467 A1 Dec. 17, 2009

(30) Foreign Application Priority Data

Jun. 13, 2008 (CN) .......................... 2008 1 0067843

(51) Int. Cl.
*C03B 23/20* (2006.01)

(52) U.S. Cl. ..................................... 65/42; 65/54; 65/63

(58) Field of Classification Search ................ 65/42, 54, 65/63; 362/351, 356; 442/186
See application file for complete search history.

(56) References Cited

U.S. PATENT DOCUMENTS 4,415,614 A * 11/1983 von Loewis of Menar ..... 428/38
* cited by examiner

*Primary Examiner* — Alexander Thomas
(74) *Attorney, Agent, or Firm* — Matthias Scholl P.C.; Matthias Scholl

(57) ABSTRACT

A multiple-layered hot-melt glass lampshade having a crystal-interwoven structure with a first hot-melt glass layer, a second hot-melt glass layer, a third hot-melt glass layer, a first crystal glass layer, a second crystal glass layer, and a curing gel layer. The order of arrangement is, from outside to inside, the first hot-melt glass layer, the second hot-melt glass layer, the third hot-melt glass layer, the first crystal glass layer, the curing gel layer, and the second crystal glass layer. The first hot-melt glass layer, the second hot-melt glass layer, and the third hot-melt glass layer are partially attached to each other. The third hot-melt glass layer is partially attached to the first crystal glass layer.

5 Claims, 1 Drawing Sheet

GLASS LAMPSHADE AND METHOD FOR PRODUCING THE SAME

CROSS-REFERENCE TO RELATED APPLICATIONS

Pursuant to 35 U.S.C. §119 and the Paris Convention Treaty, this application claims the benefit of Chinese Patent Application No. 200810067843.8 filed on Jun. 13, 2008, the contents of which are incorporated herein by reference.

BACKGROUND OF THE INVENTION

1. Field of the Invention

The invention relates to a lampshade and a method for producing the same, and more particularly to a multiple-layered crystal glass lampshade and a method for producing the same.

2. Description of the Related Art

Glass lampshades are widely used in illuminating devices. However, there are several problems with conventional glass lampshades. Firstly, they feature simple technological designs and therefore achieve insufficient decorative effect; secondly, they have poor transparency and therefore feature poor illuminating effect; thirdly, they are usually unsafe since they easily break possibly causing injuries.

BRIEF SUMMARY OF THE INVENTION

In view of the above-described problems, it is one objective of the invention to provide a multiple-layered crystal glass lampshade comprising a crystal-interwoven structure that features good decoration and illuminating effect and safety.

It is another objective of the invention to provide a method for producing a multiple-layered crystal glass lampshade comprising a crystal-interwoven structure that features good decoration and illuminating effect and safety.

To achieve the above objectives, in accordance with one embodiment of the present invention, provided is a multiple-layered crystal glass lampshade comprising a crystal-interwoven structure, comprising a first hot-melt glass layer, a second hot-melt glass layer, a third hot-melt glass layer, a first crystal glass layer, a second crystal glass layer, and a curing gel layer; the order of arrangement is, from outside to inside, the first hot-melt glass layer, the second hot-melt glass layer, the third hot-melt glass layer, the first crystal glass layer, the curing gel layer, and the second crystal glass layer; and the first crystal glass layer adheres to the second crystal glass layer via the curing gel layer; the first hot-melt glass layer, the second hot-melt glass layer, and the third hot-melt glass layer are partially attached to each other; and the third hot-melt glass layer is partially attached to the first crystal glass layer.

In accordance with another embodiment of the present invention, provided is a method for producing a multiple-layered crystal glass lampshade comprising a crystal-interwoven structure, comprising the steps of: cutting a crystal glass plate with a thickness of between 4 and 6 mm into multiple strip-shaped glass sheets, then cleaning and drying the strip-shaped glass sheets, arranging the strip-shaped glass sheets in an interwoven structure by means of a mold, putting the strip-shaped glass sheets into a hot melting furnace and raising the temperature of the furnace to between 700 and 730° C. over a period of 4 to 6 hours and maintaining that temperature for 25-35 minutes so that adjacent strip-shaped glass sheets are partially attached to each other; decreasing temperature to room temperature over a period of 24-48 hours to form a single-layered hot-melt glass, placing a pair of the single-layered hot-melt glasses into the mold and heating the furnace to between 700 and 730° C. and maintaining at that temperature for 25-35 minutes so that adjacent single-layered hot-melt glasses are partially attached to each other, and decreasing temperature to room temperature over a period of between 24 and 72 hours to form a double-layered hot-melt glass; placing a pair of crystal glass plates filled with a mold release agent with a thickness of 1-2 mm between the crystal glass plates into the mold, putting the single-layered hot-melt glass and the double-layered hot-melt glass on the crystal glass plates, heating them in a furnace to between 700 and 730° C. over a period of between 4 and 6 hours and maintaining that temperature for 25-35 minutes so that they are partially attached to each other, and decreasing temperature to room temperature over a period of between 24 and 72 hours to form a triple-layered body; and cleaning the mold release agent, injecting curing gel between the crystal glass plates, and irradiating the crystal glass plates by sunlight or ultraviolet light.

In certain classes of this embodiment, the step of arranging the strip-shaped glass sheets in an interwoven structure by means of a mold comprises: disposing and abutting a first strip-shaped glass sheet of each column in and against the mold; vertically and sequentially attaching a plurality of the strip-shaped glass sheets to the first strip-shaped glass sheet in a domino-like manner; crossing a first strip-shaped glass sheets of each line with a first strip-shaped glass sheet of a first column; and horizontally and sequentially attaching a plurality of the strip-shaped glass sheets to the first strip-shaped glass sheet of the first column in a domino-like manner.

In certain classes of this embodiment, the step of arranging the strip-shaped glass sheets in an interwoven structure by means of a mold comprises vertically disposing and abutting a plurality of the strip-shaped glass sheet of a first column in and against the mold, arranging in criss-cross and sequentially a plurality of the strip-shaped glass sheet from a first strip-shaped glass sheet of the first column.

In certain classes of this embodiment, the temperature is decreased to room temperature slowly, over a period of between 48 to 72 hours.

In certain classes of this embodiment, the strip-shaped glass sheet is a trapezoid, with a thickness of 4 mm or 6 mm, a height of 40±1 mm, a width of a longer parallel side of 15±1 mm, and a width of a shorter parallel side of 0.5-1 mm less than that of the longer parallel side.

In certain classes of this embodiment, a thickness of the strip-shaped glass sheet is 4 mm or 6 mm, a length of between 30 and 50 mm, and a width of between 12 and 8 mm.

In certain classes of this embodiment, a thickness of the single-layered hot-melt glass is respectively 4 mm and 6 mm, and the single-layered hot-melt glass having a thickness of 6 mm abuts against the mold.

In one embodiment of the invention, a plurality of strip-shaped glass sheets are arranged in an interwoven structure, and hot melted in a hot melting furnace. In the process of preparing a lampshade, a pair of crystal glass plates is used as a substrate, and a single-, double-layered hot-melt glass are put on an upper plate of a pair of crystal glass plates. When the temperature of the hot melting furnace is increased to between 700 and 730° C., the surface of the single-, double-layered hot-melt glass is in a molten state, and they are partially attached to each other. Meanwhile, they are partially attached to the upper crystal glass plate. With the decrease of the temperature of the hot melting furnace to room temperature, internal stress is eliminated. Due to a thin layer of a mold release agent between the pair of crystal glass plates, in the process of hot melt in the mold, the pair of crystal glass plates is not attached to each other, and maintains a parallel state. After the pair of crystal glass plates are cooled down and taken out from the hot melting furnace, a curing gel is filled between them to ensure the glass plates not to break easily.

Advantages of the glass lampshade of the invention comprise: good decoration and illuminating effect, and good safety since any inner stresses are eliminated.

DETAILED DESCRIPTION OF THE EMBODIMENTS

Figure 1:
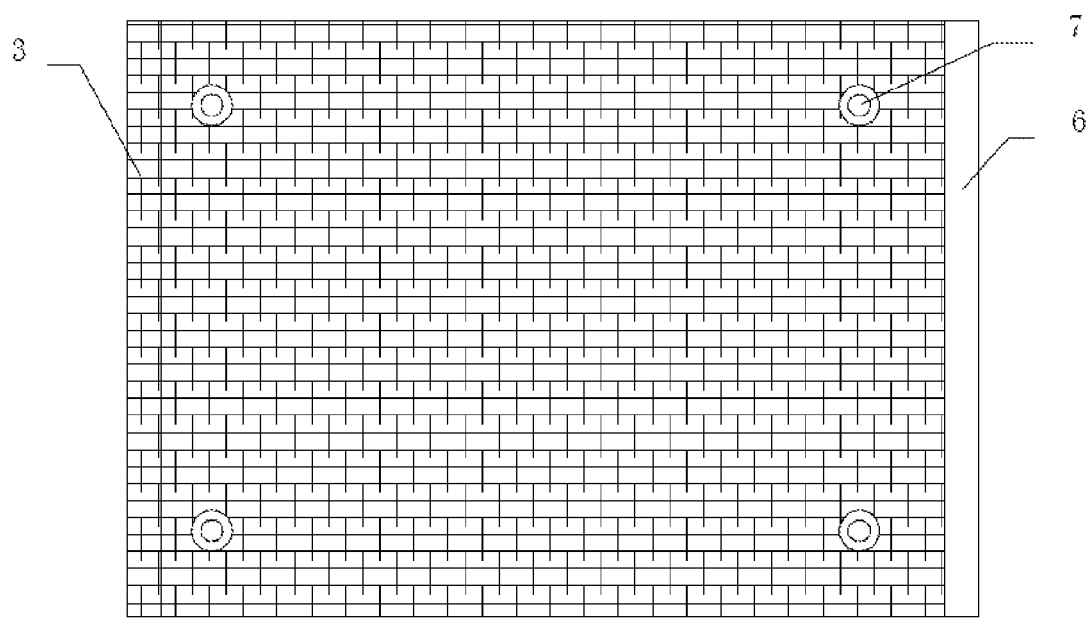
FIG. 1 is a front view of a multiple-layered hot-melt glass lampshade according to one embodiment of the invention.

A method for producing a multiple-layered hot-melt glass lampshade comprises the steps of:

(1) Forming a single-layered hot-melt glass:

A pair of crystal glass plate with a thickness of 4 mm and 6 mm respectively was cut into multiple strip-shaped glass sheets. The obtained strip-shaped glass sheets are a trapezoid, with a thickness of 4 mm or 6 mm, a height of 40 mm, a width of a longer parallel side of 15 mm, and a width of a shorter parallel side of 0.5 mm or 1 mm less than that of the longer parallel side. The strip-shaped glass sheets with a thickness of 4 mm or 6 mm were cleaned, dried, arranged in an interwoven structure by means of a mold, put into a hot melting furnace, heated to 700° C. or 730° C. over a period of 5 hours and maintained for 30 minutes at that temperature so that adjacent strip-shaped glass sheets were partially attached to each other. Then, the temperature was decreased to room temperature over 24 or 48 hours to respectively form a thin and thick single-layered hot-melt glass.

(2) Forming a double-layered hot-melt glass:

The obtained thin and thick single-layered hot-melt glass was put into a mold, and the thin glass was placed on the surface of the thick glass. The glass sheets were heated to 700° C. over a period of 4 or 6 hours and maintained at that temperature for 30 minutes in the hot melting furnace so that adjacent single-layered hot-melt glasses became partially attached to each other. Then, the temperature was decreased to room temperature over a period of 36 or 38 hours to form a double-layered hot-melt glass.

(3) Forming a triple-layered hot-melt glass:

A pair of crystal glass plates, e.g., with a thickness of 5 mm, a length of 500 mm, and a width of 350 mm, were collected, filled with a mold release agent with a thickness of 1.5 mm, and placed into a mold. The single-layered hot-melt glass and the double-layered hot-melt glass were placed on the pair of crystal glass plates, heated to 730° C. in 4 or 6 hours and maintained for 35 minutes in the hot melting furnace so that they were partially attached to each other. Then, the temperature was decreased to room temperature over a period of 48 hours to form a triple-layered body.

(4) Cleaning the mold release agent, injecting curing gel between the crystal glass plates, and irradiating the crystal glass plates by sunlight or ultraviolet light to give a multiple-layered hot-melt glass lampshade comprising a crystal-interwoven structure.

The step of arranging the strip-shaped glass sheets in an interwoven structure by means of a mold comprises disposing and abutting a first strip-shaped glass sheet of each column in and against the mold; vertically and sequentially attaching a plurality of the strip-shaped glass sheets to the first strip-shaped glass sheet in a domino-like manner; crossing a first strip-shaped glass sheets of each line with a first strip-shaped glass sheet of a first column; and horizontally and sequentially attaching a plurality of the strip-shaped glass sheets to the first strip-shaped glass sheet of the first column in a domino-like manner.

Optionally, the step of arranging the strip-shaped glass sheets in an interwoven structure by means of a mold comprises vertically disposing and abutting a plurality of the strip-shaped glass sheet of a first column in and against the mold, arranging criss-cross and sequentially a plurality of the strip-shaped glass sheet from a first strip-shaped glass sheet of the first column.

In this embodiment, a thickness of the strip-shaped glass sheet of the pair of single-layered hot-melt glass is respectively 4 mm and 6 mm, and the single-layered hot-melt glass having a thickness of 6 mm abuts against the mold. Optionally, the thickness of the strip-shaped glass sheet of the pair of single-layered hot-melt glass may be the same, e.g., both 4 mm or 6 mm.

In this embodiment, the strip-shaped glass sheet is a trapezoid, with a thickness of between 4 and 6 mm, height of 40±1 mm, width of a longer parallel side of 15±1 mm, and width of a shorter parallel side of 0.5-1 mm less than that of the longer parallel side.

In another embodiment, the strip-shaped glass sheet is a rectangle, with a thickness of between 4 and 6 mm, length of between 30 and 50 mm, and width of between 12 and 18 mm.

In step (1), the temperature of the hot melting furnace was raised to between 700 and 730° C. over a period of between 4 and 6 hours and maintained at that temperature for 25-35 minutes, and then decreased to room temperature over a period of between 24 and 48 hours.

In steps (2) and (3), the temperature of the hot melting furnace was raised to between 700 and 730° C. over a period of between 4 and 6 hours and maintained at that temperature for 25-35 minutes, and then decreased to room temperature over a period of between 24 and 72 hours. The maintaining time can be modified according to the product specification and glass materials.

In this embodiment, a thickness of the mold release agent is between 1 and 2 mm, and the mold release agent is made of white and powdery aluminum hydroxide with fineness above 300 mesh.

Figure 2:
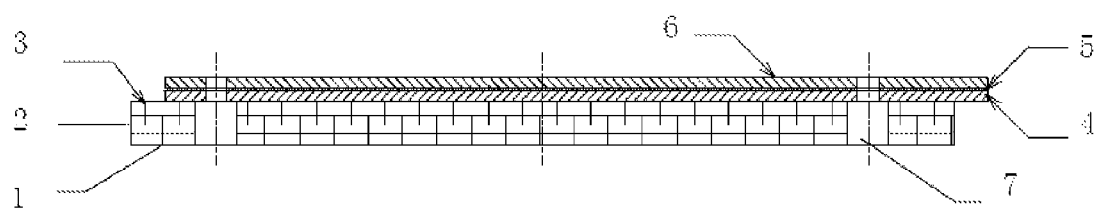
FIG. 2 is a cross-sectional view of the multiple-layered hot-melt glass lampshade in FIG. 1.

Following the above-mentioned method, a multiple-layered hot-melt glass lampshade comprising a crystal-interwoven structure is produced, as shown in FIGS. 1-2. The multiple-layered hot-melt glass lampshade having a length of 500 mm, width of 350 mm, and thickness of 28 mm, comprises a first hot-melt glass layer 1, a second hot-melt glass layer 2, a third hot-melt glass layer 3, a first crystal glass layer 4, a second crystal glass layer 6, and a curing gel layer 5. The order of arrangement of the layers is, from outside to inside, the first hot-melt glass layer 1, the second hot-melt glass layer 2, the third hot-melt glass layer 3, the first crystal glass layer 4, the curing gel layer 5, and the second crystal glass layer 6. The first crystal glass layer 4 adheres to the second crystal glass layer 6 via the curing gel layer 5. The first hot-melt glass layer 1, the second hot-melt glass layer 2, and the third hot-melt glass layer 3 are partially attached to each other. The third hot-melt glass layer 3 is partially attached to the first crystal glass layer 4. There is also provided a mounting hole 7. For installation purposes, the triple-layered hot melt glass can be interlaced with the pair of crystal glass plates.

In a class of this embodiment, each of the first hot-melt glass layer, the second hot-melt glass layer, and the third hot-melt glass layer comprises a plurality of strip-shaped glass sheets partially attached to one other by heating in a hot melting furnace; a plurality of the strip-shaped glass sheets are vertically and sequentially attached in a domino-like manner, each column having gaps; a plurality of the strip-shaped glass sheets are horizontally and sequentially attached in a domino-like manner, each line having gaps; a gap exists among the first hot-melt glass layer, the second hot-melt glass layer, and the third hot-melt glass layer; and a gap exists between the third hot-melt glass layer and the first crystal glass layer.

In another class of this embodiment, each of the first hot-melt glass layer, the second hot-melt glass layer, and the third hot-melt glass layer comprises a plurality of strip-shaped glass sheets partially attached to each other by heating in a hot melting furnace; a plurality of the strip-shaped glass sheet of a first column are vertically disposed in the mold and abut against the mold; a plurality of the strip-shaped glass sheet are arranged in criss-cross and sequentially from a first strip-shaped glass sheet of the first column; a gap exists in the first hot-melt glass layer, the second hot-melt glass layer, and the third hot-melt glass layer; and a gap exists between the third hot-melt glass layer and the first crystal glass layer.

The curling gel between the pair of crystal glass plates is ultraviolet radiation curing gel having a thickness of between 1 and 2 mm.

In each layer of the hot-melt glass comprising a crystal-interwoven structure, a first gap having a width of between 0.5 and 3 mm between columns is provided, and a second gap having a width of between 0.5 and 3 mm between lines is provided.

A method for producing a multiple-layered hot-melt glass lampshade comprising a crystal-interwoven structure, comprises: cutting a crystal glass plate with a thickness of 4-6 mm into a plurality of strip-shaped glass sheets, then cleaning and drying the strip-shaped glass sheets, arranging the strip-shaped glass sheets in an interwoven structure by means of a mold, putting the strip-shaped glass sheets into a hot melting furnace and raising the temperature of the furnace to between 700 and 730° C. over a period of 4 to 6 hours and maintaining that temperature for 25-35 minutes so that adjacent strip-shaped glass sheets become partially attached to one other; decreasing temperature to room temperature over a period of between 24 and 48 hours to form a hot-melt glass comprising crystal-interwoven structure. The strip-shaped glass sheet is a trapezoid, with a height of 40±1 mm, width of a longer parallel side of 15±1 mm, and width of a shorter parallel side of 0.5-1 mm less than that of the longer parallel side.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing a lampshade, comprising:
   (1) cutting a crystal glass plate with a thickness of 4-6 mm into a plurality of strip-shaped glass sheets, then cleaning and drying said strip-shaped glass sheets, arranging said strip-shaped glass sheets in an interwoven structure in a mold, putting said strip-shaped glass sheets into a hot melting furnace and heating to 700-730° C. over a period of between 4 and 6 hours and maintaining at that temperature for 25-35 minutes so that adjacent strip-shaped glass sheets become partially attached to each other, decreasing temperature to room temperature over a period of between 24 and 48 hours to form a single-layered hot-melt glass comprising a crystal- interwoven structure;
   (2) placing a pair of said single-layered hot-melt glasses comprising a crystal- interwoven structure into said mold and heating to between 700 and 730° C. and maintaining at that temperature for 25-35 minutes in said hot melting furnace so that adjacent single-layered hot-melt glasses become partially attached to one other, and decreasing temperature to room temperature to form a double-layered hot-melt glass comprising a crystal-interwoven structure;
   (3) placing a pair of crystal glass plates filled with a mold release agent with a thickness of between 1 and 2 mm between said crystal glass plates into said mold, placing said single-layered hot-melt glass and said double-layered hot-melt glass on said crystal glass plates, raising the temperature of the furnace to between 700 and 730° C. over a period of 4 to 6 hours and maintaining at that temperature for 25-35 minutes in said hot melting furnace so that said single-layered hot-melt glass, said double-layered hot-melt glass and said crystal glass plates become partially attached to one another, and decreasing temperature to room temperature to form a triple-layered body comprising a crystal- interwoven structure; and
   (4) cleaning said mold agent, injecting curing gel between said crystal glass plates, and irradiating said crystal glass plates by sunlight or ultraviolet light.

2. The method of any of claim 1, wherein decreasing temperature from between 700 and 730° C. to room temperature takes between 48 and 72 hours.

3. The method of claim 2, wherein said strip-shaped glass sheet is a trapezoid, with a thickness of 4 mm or 6 mm, a height of 40±1 mm, a width of a longer parallel side of 15±1 mm, and a width of a shorter parallel side of 0.5-1 mm less than that of said longer parallel side.

4. The method of claim 2, wherein a thickness of said strip-shaped glass sheet is 4 mm or 6 mm, a length of between 30 and 50 mm, and a width of between 12 and 18 mm.

5. The method of claim 1, wherein
   the thickness of said pair of single-layered hot-melt glass is 4 mm and 6 mm, respecttively; and
   said single-layered hot-melt glass having a thickness of 6 mm abuts against said mold.

* * * * *